US005613118A

United States Patent [19]
Heisch et al.

[11] Patent Number: 5,613,118
[45] Date of Patent: Mar. 18, 1997

[54] PROFILE-BASED PREPROCESSOR FOR OPTIMIZING PROGRAMS

[75] Inventors: Randall R. Heisch; Paul J. Kilpatrick, both of Austin, Tex.

[73] Assignee: International Business Machines Corporation, Armonk, N.Y.

[21] Appl. No.: 262,704

[22] Filed: Jun. 20, 1994

[51] Int. Cl.$^6$ ..................................................... G06F 9/44
[52] U.S. Cl. .................................... 395/709; 364/DIG. 1; 364/280.4; 364/280.5; 364/267
[58] Field of Search ............................ 371/16, 19; 395/700

[56] References Cited

U.S. PATENT DOCUMENTS

| | | | |
|---|---|---|---|
| 3,427,443 | 4/1965 | Apple et al. | 371/19 |
| 3,551,659 | 12/1970 | Forsythe | 371/19 X |
| 4,595,911 | 6/1986 | Kregness et al. | 340/347 |
| 4,625,288 | 11/1986 | Weiner et al. | |
| 4,680,705 | 7/1987 | Shu | 364/300 |
| 4,819,233 | 4/1989 | DeLucia et al. | 371/19 |
| 4,953,209 | 8/1990 | Ryder, Sr. et al. | 380/23 |
| 5,088,033 | 2/1992 | Binkley et al. | |
| 5,452,457 | 9/1995 | Alpert et al. | 395/700 |
| 5,465,248 | 11/1995 | Adams | 395/700 |

OTHER PUBLICATIONS

"An Improved Trace Facility for Object–Oriented System", Research Disclosure n315, Jul. 1990.
IBM TDB, "Method for Repackaging Control Blocks to Reduce Cache Misses", vol. 25, No. 7B, Dec. 1982, pp. 3832–3836.
IBM TDB, "Application Model of an Object–Oriented Application", vol. 36, No. 7, Jul. 1993, pp. 171–173.
IBM TDB, "Three Icons for IBM Extended Services, SNA Configure and Traces", vol. 36, No. 1, Jan. 1993, pp. 308–310.
"Profile Guided Code Positioning", K. Pettis et al., 1990 ACM 0–89791–364–7/90/0006/0016 (Proceedings of the ACM SIGPLAN '90 Conference), 12 pages. pp. 16–17.
"Using Profile Information to Assist Classic Code Optimizations", P. P. Chang et al, 1991, John Wiley & Sons, 0038–0644/91/121301–21, 21 pages.
"Improving UNIX Kernel Performance Using Profile Based Optimization", S. E. Speer et al, 1994 Winter USENIX, Jan. 17–21, 1994, pp. 181–188.
"Rewriting Executable Files to Measure Program Behavior", Larus et al., Univ. oof Wisconsin Comp. Sci, Tech. Report 1083, Mar. 1992.
"Profile Guided Code Positioning", Pettis et al., Proc. of the ACM SIGPLAN '90 Conf. on Progr. Lang. Design and Impl., Jun. 20–22, 1990, pp. 16–27.

*Primary Examiner*—Kevin A. Kriess
*Assistant Examiner*—Kakali Chaki
*Attorney, Agent, or Firm*—Diana L. Roberts

[57] ABSTRACT

The present invention is an system and method for optimizing a program, having qualified elements, at the source level. The method includes the steps of instrumenting each path of the qualified elements to create an instrumented program, executing the instrumented program to produce instrumentation information for each of the paths, analyzing the instrumentation information, and in response to the analyzing step, restructuring the program to create an optimize program.

1 Claim, 5 Drawing Sheets

After Restructuring

```
401 — int       global1;
402 — int       global6;
403 — int       global10;
404 — unsigned  global13;
      int       global2;
      int       global3;
      int       global4;
      int       global5;
      int       global7;
      struct S1 global8;
      int       global9;
      int       global11;
      int       global12;

409
  — procA ( )   410       413    416
    {            412       414
    int i, z;   float c, d;   int *q;
    int j, k, x, y;   float a, b, e, f;
    int *p;
421
  — if ( !condition1 )
    {
      statement_b1;
      global = global1 + 1;
      procD ( );
      global6 = global6 + global13;
      •
      •
      i = i + 1;                    430
    }
                                            423
                                              — else
                                                {                   422
                                                statement_a1;
                                                statement_a2;
                                                  •
                                                  •
                                                statement_aN;
                                                }
                                            }
                                        440
                                          — procD ( )
                                            {
                                              •
                                              •
                                        435 }
                                          — procB ( ) { ••• };
                                          — procC ( ) { ••• };
                                        437
```

FIG. 4b

PROFILE-BASED PREPROCESSOR FOR OPTIMIZING PROGRAMS

BACKGROUND OF THE INVENTION

1. Field of the Invention

The present invention relates to improvements in software optimization tools and, more particularly, to a profile-based preprocessor.

2. Background Information and Description of the Related Art

A "profile" is a characterization of the execution of a program. Illustratively, a profile provides the number of times each instruction is executed in each subroutine of a program. Consequently, profiling indicates which portions of the program require the most central processing unit (CPU) time and, thus, are candidates for optimization.

Conventional profiling tools are commonly used in hardware and software performance analysis. These tools typically add instrumentation instructions to each basic block of a program to analyze and test the program. The instrumentation instructions typically increment a counter or write a record to a trace list each time a particular basic block is executed.

However, once a profile has been completed and the developer has ascertained which portions of the program requires the most CPU time, problems arise on how to optimize the program. One specific problem relates to computer systems' storage hierarchies. FIG. 1b illustrates a typical storage hierarchy, which includes central processing unit ("CPU") 130, cache 140, random access memory ("RAM") 150, and disk memory 160. CPU 130 typically retrieves instructions and/or data directly from cache 140, which is the fastest, smallest, and most expensive storage device. Cache 140 allocates its memory space in groups of words. In this example, cache 140 allocates sixteen words per cache line and has 64 lines. Therefore, CPU 130 retrieves 64 groups of sixteen words from RAM 150 and stores them into cache 140.

A memory allocation problem arises when CPU 130 must repeatedly execute specific lines of code that are separated by multiple lines of code that are seldom or never executed. Specifically, referring to FIG. 1a, lines 100, 110, and 120 contain either a conditional or while statement. At line 100, if the condition is not met, then a jump to line 110 occurs and the else statements S8–S13 and Proc A are executed. Otherwise, the statements S1–S7 are executed. However, statements S1–S7 could be, for example, error correction code which is seldom, if ever, executed. Therefore, in this example, line 110 is satisfied often and, thus, statements S8–S13 and Proc A are executed often, while line 100 is seldom satisfied and, thus, statements S1–S7 are executed seldom.

However, as previously described, to test line 100, CPU 130 will allocate sixteen sequentially ordered words of code per line of cache 130. Therefore, statements S1–S7 will be stored in cache 130. As such, this allocation fills valuable cache memory with seldom or never executed code. Consequently, cache 130 may not be capable of storing other highly executed code such as, for example, lines 110 and 120. Therefore, CPU 130 would have to retrieve that highly executed code from memory 150 or disk 160, significantly degrading operating speed and performance.

In an attempt to mitigate these problems, preprocessors have been developed to optimize software performance and reduce real memory requirements. Some conventional preprocessors statically scan and restructure a program at the source code level when the preprocessor detects a conditional statement in the program. To do so, the preprocessors make assumptions or "guesses" as to which path each conditional statement takes. Often these "guesses" are not representative of what actually occurs at program execution.

Other conventional preprocessors dynamically profile a program at the source code level, but restructure the program at the executable level. To do so, a conventional "postprocessor" restructures the executable code according to the profile information. However, this technique creates significant disadvantages, such as the inability to restructure data with guaranteed functionality due to indirect/dynamic data references, which are references to data addresses that are calculated at run time. The program can also be restructured by a compiler at compile time. To do so, however, requires an enormous amount of modification to the compiler and significantly slows compilation time.

Therefore, there is great need for a preprocessor that dynamically profiles a program at the source code level, analyzes the conditional statements, procedures, and groups of data elements in that program to determine frequency of execution, and then restructures the program accordingly at the source code level.

SUMMARY OF THE INVENTION

It is an object of the present invention to provide a system and method for optimizing a program, having qualified elements, at the source code level. Specifically, the method includes the steps of instrumenting each path of the qualified elements to create an instrumented program, executing that instrumented program to produce instrumentation information for each of the paths, analyzing the instrumentation information, and in response to the analyzing step, restructuring the program to create an optimized program at the source level.

The system includes a processor, a storage device, means for controlling the processor to instrument each path of the qualified elements to create an instrumented program, means for executing the instrumented program to produce instrumentation information for each of the paths, the instrumentation information being stored in the storage device, means for controlling the processor to analyze the instrumentation information, and in response to analyzing the instrumentation information, means for controlling the processor to restructure the original program to create an optimized program at the source level.

BRIEF DESCRIPTION OF THE DRAWINGS

FIG. 4a and 4b are pictorial views of code before and after restructuring.

DETAILED DESCRIPTION OF THE PREFERRED EMBODIMENT

Figure 1A:
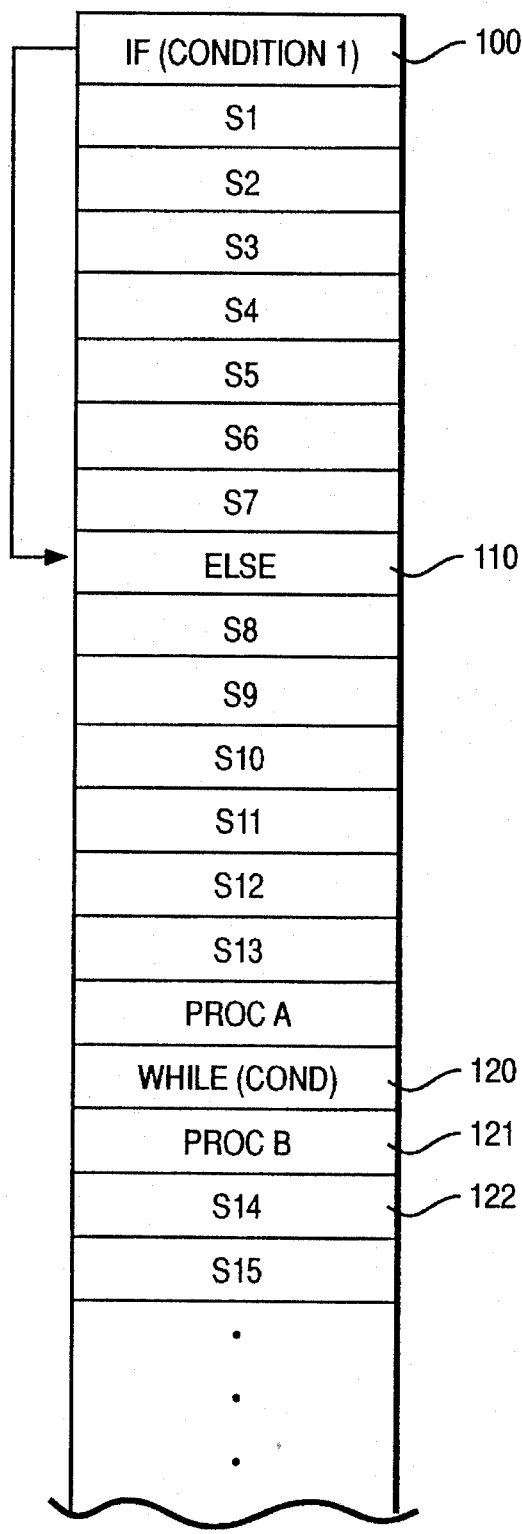
FIG. 1a is a prior art pictorial view of a program containing lines of source code as they might map to instructions cache lines.
Figure 1B:
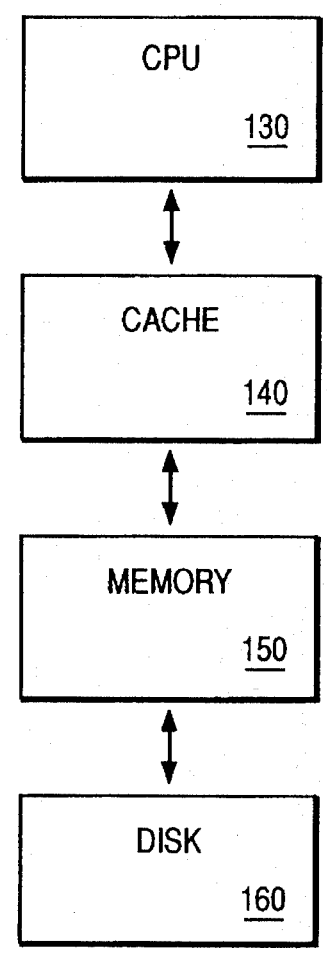
FIG. 1b is a prior art pictorial view of a memory hierarchy for a computer system.

The preferred embodiment includes a system and method for optimizing programs at the source code level. The preferred embodiment is preferably practiced in a suitable representative hardware configuration, such as the hardware configuration illustrated in FIG. 2

Workstation 200 includes any suitable central processing unit 210, such as a conventional microprocessor, and a number of other units interconnected via system bus 212. Illustratively, workstation 200 comprises Random Access Memory (RAM) 214, Read Only Memory (ROM) 216, cache 211, display adapter 236 for connecting system bus 212 to display device 238, and I/O adapter 218 for connecting peripheral devices (e.g. disk and tape drives 220) to system bus 212. Workstation 200 further comprises user interface adapter 222 for connecting keyboard 224, mouse 226, speaker 228, microphone 232, and/or other user interface devices, such as a touch screen device (not shown), to system bus 212. Communication adapter 234 connects workstation 200 to a data processing network.

The preferred embodiment includes a preprocessor which resides within a machine-readable media to direct the operation of workstation 200. Any suitable machine-readable media may retain the preprocessor, such as RAM 214, ROM 216, a magnetic diskette, magnetic tape, or optical disk (the last three being located in disk and tape drives 220). The preprocessor controls CPU 210 to copy, instrument (described herein), execute, analyze, and restructure a program. For ease in explanation, the following specification describes the preprocessor as performing those various tasks. In actuality, the preprocessor merely controls and directs CPU 210 to perform those tasks.

Figure 3:
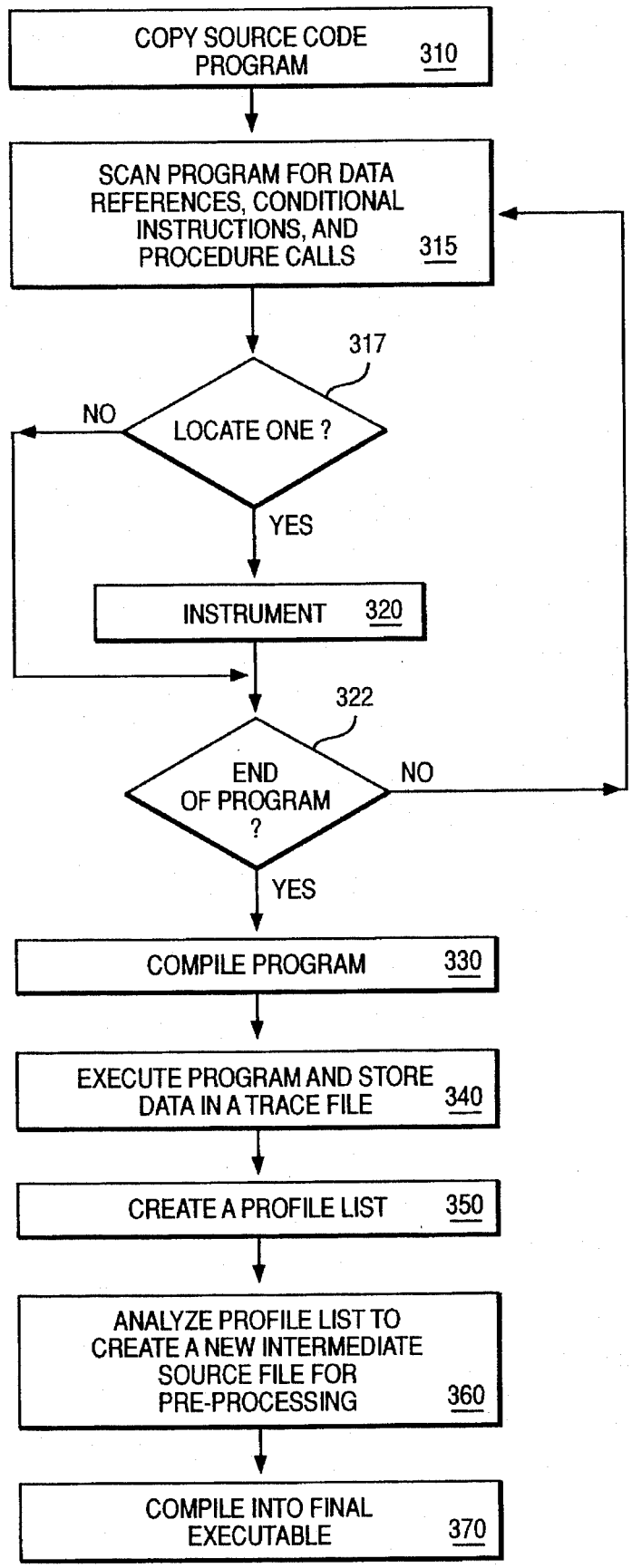
FIG. 3 is a flow chart in accordance with the present invention.

FIG. 3 is a flow chart of the preprocessor in accordance with the preferred embodiment. At 310, the preprocessor makes one copy of the program that is the candidate for optimization. That program includes either a single program or multiple programs and is in the form of source code.

At 315, the preprocessor statically scans the copied program for every conditional instruction (e.g. IF/THEN/ELSE statement, WHILE statement), procedure calls, and data references (e.g. i=i+j). Each conditional instruction, procedure call, and data reference is collectively referred to as a qualified element.

A determination is made at 317 as to whether a qualified element has been detected. If so, at 320, the preprocessor inserts a piece of instrumentation code at the beginning of each path of the qualified element. In the case of a data reference, its path is considered to be the data reference itself. Therefore, the instrumentation code is inserted immediately after each data reference.

This insertion process is referred to as "instrumenting" the path. Moreover, the copied program can be thought of as being "instrumented". As such, all procedures will have instrumentation code inserted immediately after the procedure call. Similarly, each path of a conditional instruction will be instrumented. For example, the instrumentation code will be inserted immediately after an IF statement and its corresponding ELSE statement.

Otherwise, a determination is made at 318 as to whether the preprocessor has scanned the entire program. If not, the preprocessor continues to scan the program at 315 for data references, conditional instructions, and procedure calls. In sum, the preprocessor statically scans and instruments each path until no additional data references, conditional instructions, or procedure calls are found.

Figure 2:
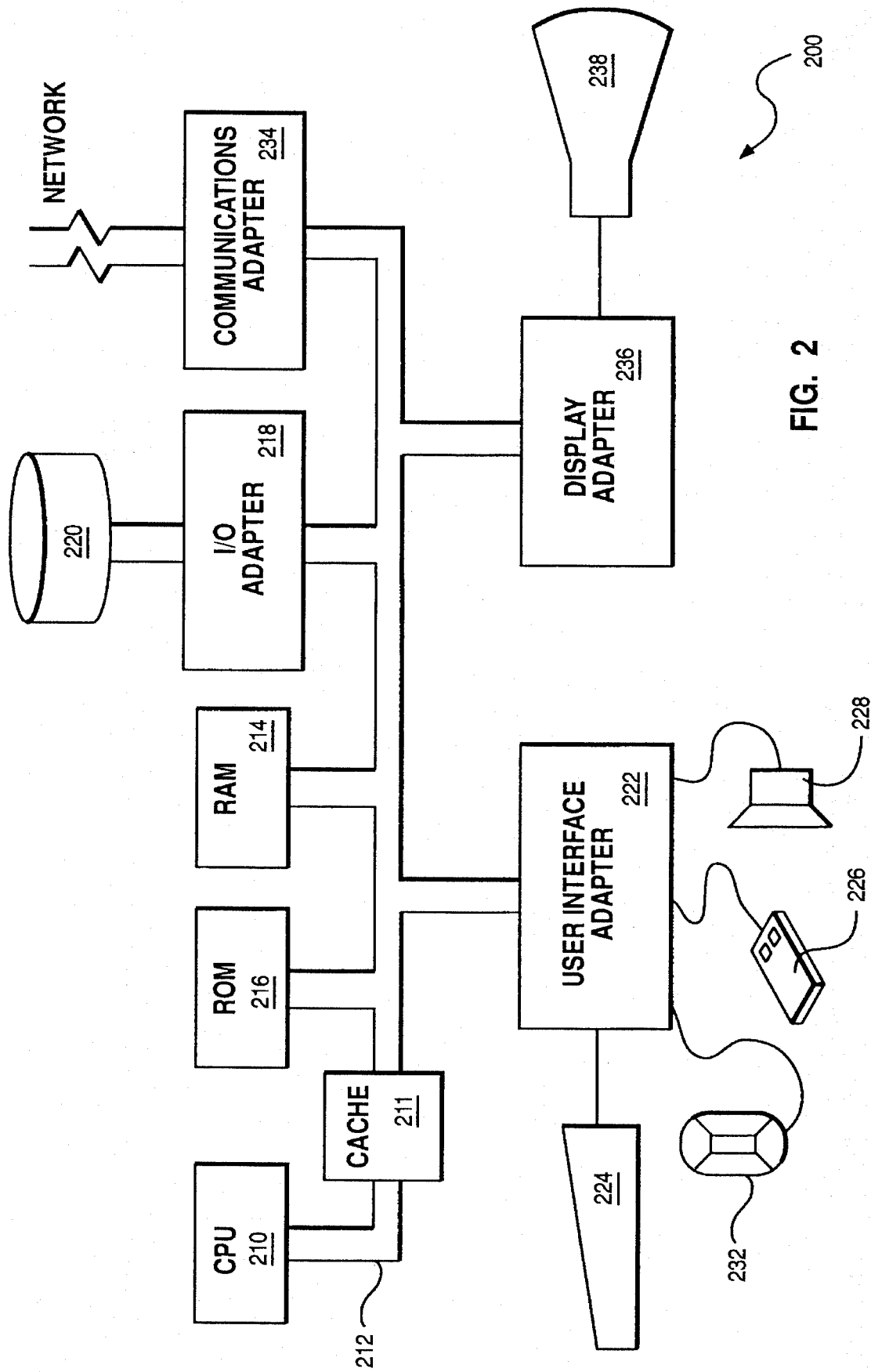
FIG. 2 is a schematic diagram of hardware for use with the present invention.

In the preferred embodiment, the instrumentation code includes a print statement for storing the line number and source filename of the immediately preceding statement/instruction (i.e. qualified element) into a trace file (not shown) created for instrumentation on a disk (see FIG. 2). Therefore, at program execution, each time a path is taken, the line number and source filename of the proceeding instruction will be written into the trace file. Also, any variables or procedure calls located in the immediately preceding statement/instruction are stored in the trace file. For example, if line 100 is "i=i+j", the variable i and j are entered into the trace file. The preprocessor will later analyze this trace file to determine which lines should be relocated (described herein).

At 330, a compiler (not shown) compiles the "instrumented" program into instrumented executable code. This executable code is executed at 340 using a typical workload. As described above, upon execution, the line number, any variables, any procedure calls, and source filename of the qualified element is entered into the trace file each time its path is executed. The information stored in the trace file is referred to as instrumentation information.

At 350, when the executable code completes execution, the preprocessor analyzes the trace file to determine the most frequent and least frequent number of "hits" or executions of each qualified element. The preprocessor then stores that information, including the line number and filename of each executed qualified element into a profile list as a directed flow graph. The directed flow graph contains information regarding the number and sequence of executions of each qualified element, such as, for example, line number XX was visited 100,000 times, and then a jump to line number YY occurred 1000 times, while a jump to line ZZ occurred 99,900 times and so on. Directed flow graphs are well known in the art and need not be further discussed.

At 360, the preprocessor discards the instrumented executable code. Also, the preprocessor creates a new intermediate source file from the original source code using the information stored in the profile list. This process, referred to as restructuring, relocates certain pieces of source code within the program without changing its functionality.

In the preferred embodiment, a simple majority of one executed path (e.g. IF statement) over its corresponding executed path (e.g. ELSE statement) determines if the lines of code will be restructured. Illustratively, if the path of an "IF" statement was taken 10,000 times, while the path of its corresponding "ELSE" statement was taken 9000 times, those paths may be restructured (described herein). However, one skilled in the art readily recognizes that any desired ratio could be used in the analysis stage, for example, a ratio of 3:2, 2:1, or 5:1 could be used to determine if certain paths should be restructured.

Figure 4A:
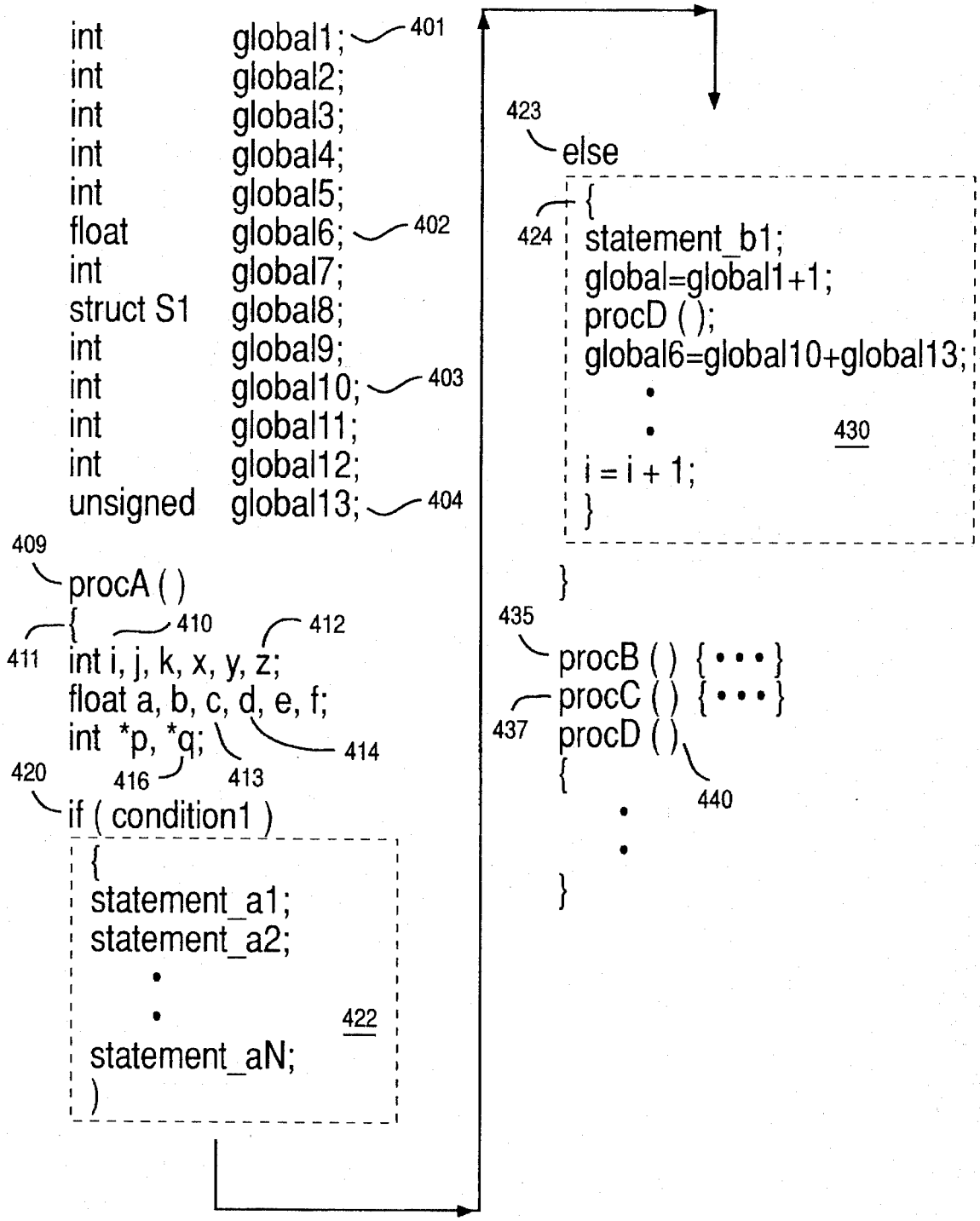

FIG. 4a illustrates a small piece of originally created source code. In this example, according to a recently created profile list (not shown), procD() 440, data or variable global1 401, global6 402, global10 403, global13 404, integers i and z, floating points c and d, and integer *q are executed or referenced often. Further, "if" conditionl statement 420 is seldom satisfied and, therefore, statements 422 are seldom executed. Conversely, conditional "else" statement 423 is often satisfied and, therefore, statements 430 are executed often. Notice, however, the number of seldom-executed referenced statements, instructions, variables, procedures, etc. between the previously described most-executed elements. Consequently, this program is a prime candidate for optimization.

To optimize this program, as previously described, the preprocessor inserts instrumentation code immediately after procA() 409 (not shown), "if" conditionl statement 420, "else" statement 423, procB() 435, procC() 437, procD()

440, and so on. Next, the instrumented program is compiled and executed to create a trace file. After execution, the preprocessor creates a profile list from the trace file by comparing each executed qualified element (e.g. procD() 440) with related executed qualified element(s) (e.g. procB() 435 and procC() 437).

The preprocessor restructures the original program using the information stored in the profile list. FIG. 4b illustrates the new intermediate source file of FIG. 4a after restructuring. Referring to FIGS. 4a and according to the profile list, data definitions global1 401, global6 402, global10 403, and global13 404 were referenced often and together, therefore, the preprocessor relocated them together at the top of the new intermediate source file. Similarly, procD() 440 was executed often and in sequence with procA() 409, therefore, the preprocessor relocated it before procB() 435 and procC() 437. The same process is applied to integers i and z, floating points c and d, and integer *q, which are locally declared "automatic" stack variables.

Conversely, however, "if" conditionl statement 420 was seldom satisfied, while "else" statement 423 was often satisfied. Therefore, the preprocessor re-coded "if" conditionl statement 420 as its negative (i.e. "IF NOT" conditionl statement 421). Further, so functionality would not be changed, the preprocessor relocated statements 430 immediately after "IF NOT" conditionl statement 421. Similarly, the preprocessor relocated statements 422 immediately after "else" statement 423.

Finally, the new intermediate source file illustrated in FIG. 4b is compiled at 370 (see FIG. 3) to generate an optimized, executable version of the program. This executable program maintains the exact same functionality, but runs much faster and uses less real memory than its non-optimized counterpart.

While the invention has been shown and described with reference to particular embodiments thereof, it will be understood by those skilled in the art that the foregoing and other changes in form and detail may be made therein without departing from the spirit and scope of the invention, which is defined only by the following claims.

We claim:

1. A method for controlling a computer system to optimize a source code program, having a plurality of data references, at the source code level, comprising the steps of:

inserting instrumentation code after each data reference in said source code program, thereby creating an instrumented source code program;

said instrumentation code having instructions for storing a representation of the previous data reference into a storage media each time said data reference is executed;

compiling said instrumented source code program;

executing said compiled program to produce instrumentation information for each of said data references;

analyzing said instrumentation information to determine how often each data reference was executed;

comparing said number of executions for each of said data references; and sequentially reordering said data references from most executed to least executed in said source code program.

* * * * *